(No Model.) 2 Sheets—Sheet 1.
C. D. ANDERSON.
COFFEE MILL.
No. 528,499. Patented Oct. 30, 1894.
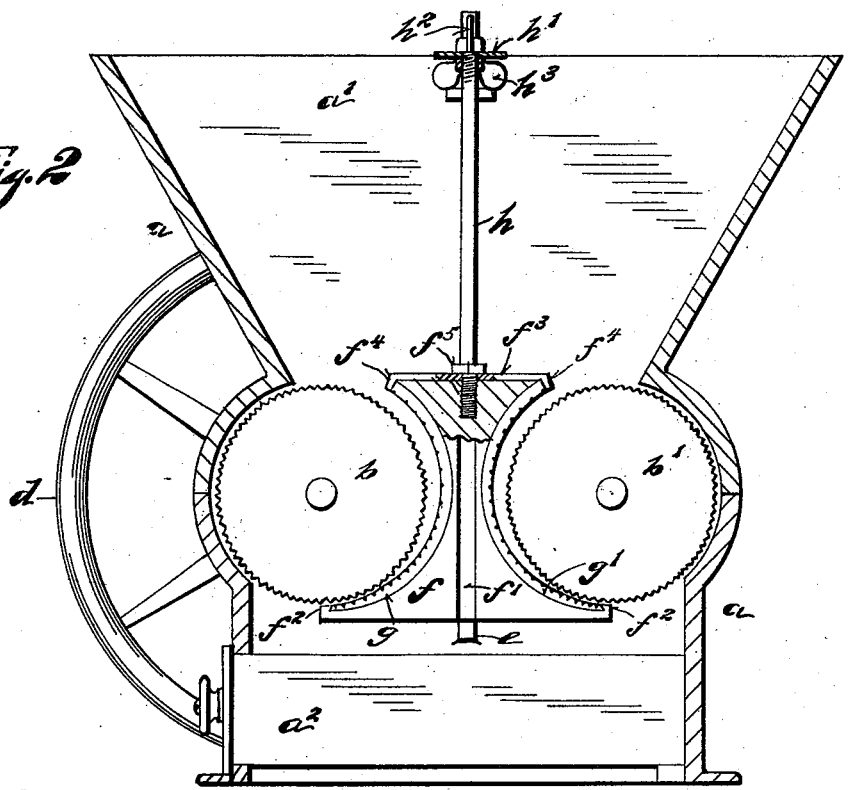
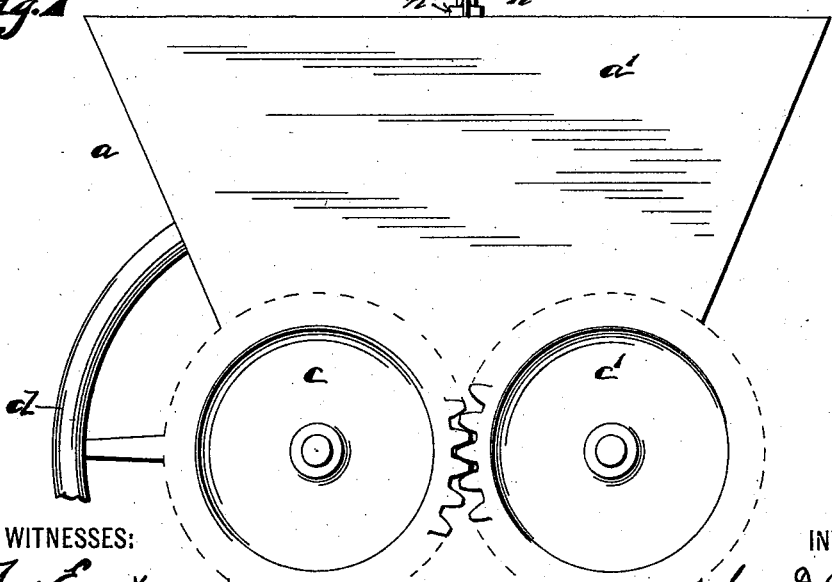
WITNESSES:
Fred Ernest
Chas. J. Welch
INVENTOR
Chas. D. Anderson
BY
Shepherd
ATTORNEYS (No Model.) 2 Sheets—Sheet 2.
C. D. ANDERSON.
COFFEE MILL.
No. 528,499. Patented Oct. 30, 1894.
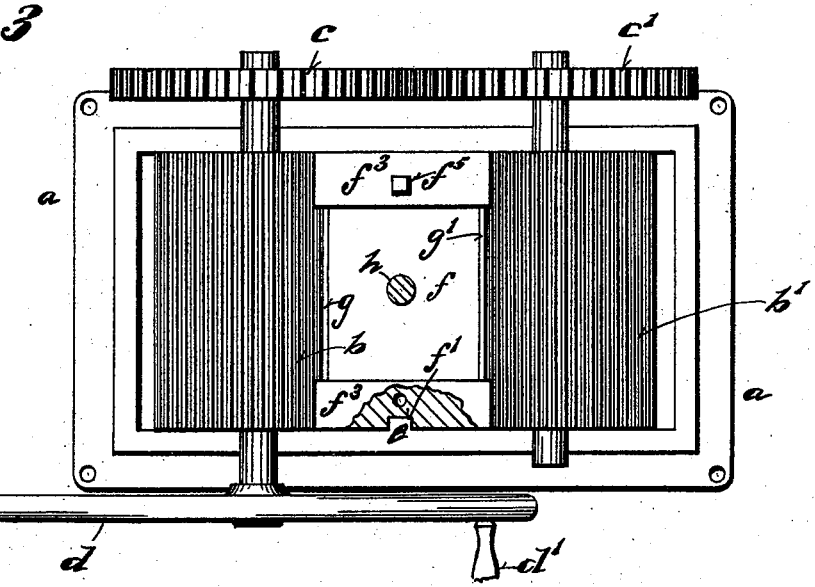
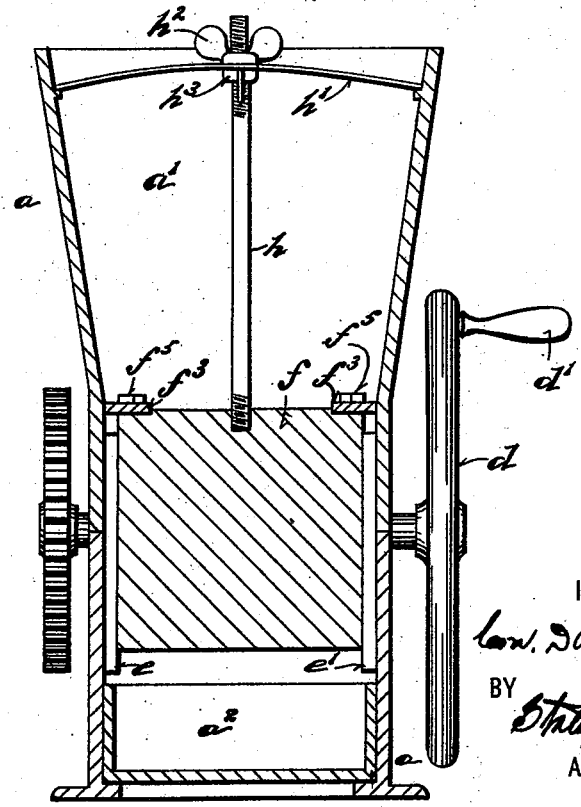
WITNESSES:
Fred Ernst
Chas. J. Welch
INVENTOR
Carl D. Anderson
BY
Staley & Shepherd
ATTORNEYS

UNITED STATES PATENT OFFICE.

CON D. ANDERSON, OF SPRINGFIELD, OHIO, ASSIGNOR OF ONE-HALF TO
J. K. MOWER, OF SAME PLACE.

COFFEE-MILL.

SPECIFICATION forming part of Letters Patent No. 528,499, dated October 30, 1894.

Application filed June 6, 1894. Serial No. 513,636. (No model.)

*To all whom it may concern:*

Be it known that I, CON D. ANDERSON, a citizen of the United States, residing at Springfield, in the county of Clark and State of Ohio, have invented certain new and useful Improvements in Coffee-Mills, of which the following is a specification.

My invention relates to improvements in mills for grinding coffee.

My invention consists in the constructions and combinations hereinafter described and pointed out in the claims.

The object of my invention is to provide a grinding mill which will have a very large capacity and output, so that a quantity of coffee can be ground quickly; the construction being such that the parts may be readily adjusted to secure the proper degree of fineness, and shall also be yieldingly supported to permit the grinding parts to separate in case a hard or foreign substance comes between the same; the constructions being also such that the grinding surfaces may be renewed as desired so as to secure an extended life of the grinding mill. I attain these objects by the constructions shown in the accompanying drawings, in which—

Figure 1 is an end elevation of a mill embodying my invention. Fig. 2 is a partial sectional view of the same showing the grinding cylinders and the adjustable concave supporting frame. Fig. 3 is a plan view with the hopper and a portion of the outer casing removed. Fig. 4 is a longitudinal sectional view showing the arrangement of the adjusting mechanism and a yielding support by which the parts are adapted to adjust themselves to the presence of foreign substances.

Like parts are represented by similar letters of reference in the several views.

In the said drawings, $a\ a$ represent an outer casing preferably cast in metal in two parts, the upper part containing a hopper $a'$, and the lower part being adapted to receive a receptacle into which the ground material is discharged, this receptacle being preferably in the form of a drawer $a^2$. Extending longitudinally through the casing between the hopper $a'$ and the drawer $a^2$ are the grinding cylinders $b$ and $b'$, which are supported on suitable journals which run in bearings preferably located in the plane on which the parts of the casing join. These grinding cylinders, $b$ and $b'$, may be made of steel or of chilled iron, and are provided on their peripheries with suitable grinding faces. They are each provided at one end with a spur gear, $c\ c'$, which gears mesh together so that the revolution of one cylinder produces a corresponding revolution of the other. The hand wheel $d$ is secured to one of the cylinders and provided with a handle $d'$; this hand wheel being also preferably in the nature of a flywheel to impart the necessary momentum to the grinding cylinders.

The casing $a\ a$ is provided on each end and on the inner surface thereof with ribs $e\ e'$. Located between the respective grinding cylinders $b$ and $b'$ is a supporting frame $f$, provided at each end with suitable slotted grooves $f'$ adapted to fit over the ribs $e\ e'$. This supporting frame $f$ is formed at each side with concave depressions to receive concave grinding plates $g\ g'$, which are formed with suitable grinding faces to correspond with the grinding cylinders. These plates $g\ g'$ are fitted into the frame $f$ and are held at the bottom with undercut flanges $f^2$ and at the top by clamping bars $f^3$, having suitable flanged ends $f^4$ to engage the tops of the grinding plates; the clamping bars being adapted to be secured to the frame $f$ by clamping screws $f^5$, which pass through the same and screw into the frame. Extending upwardly from the frame $f$ and secured stationarily thereto, is a stud or rod $h$, which passes at its upper end through a perforated spring $h'$, which extends from end to end of the hopper $a'$, to which it is secured at each end. The rod or stud $h$ is screwthreaded at the top and is provided on each side of the spring $h'$ with adjusting nuts $h^2\ h^3$, by means of which the spring may be clamped securely to said rod $h$, and at the same time the position of the rod through the spring may be adjusted, and in this way adjust the position of the concave supporting frame $f$ with reference to the grinding cylinders. The proper adjustment of the grinding surfaces to secure the desired degree of fineness may be secured, while at the same time the spring $h'$ will permit of a yielding movement of the concave supporting frame in case any hard substance should pass between the grinding surfaces and thus cause the destruction of the grinders.

It will be seen at once that the mill thus described is not only extremely simple in its construction and operation, but by the use of the double cylinder and concave with the large surface described, the machine has a very large capacity, while the adjustment of the parts is constantly under the control of the operator either while the mill is running or standing idle.

Having thus described my invention, I claim—

1. The combination with the grinding cylinders of the concave supporting frame supported on guides or ways and having at each side concave seats with undercut flanges at the bottom, removable grinding plates fitted to said seats, a clamping bar having the flanged ends to engage said plates and a clamping screw engaging said bar substantially as specified.

2. The combination with the grinding cylinders of the concave supporting frame supported on guides or ways and provided at each side with concave seats with undercut flanges at the bottom, removable grinding plates fitted to said seats, a clamping bar having the flanged ends to engage said plates, a screw-threaded stud extending through said bar and into said frame, a spring supported above said frame and perforated to receive said stud and adjusting nuts on said stud to bear on each side of said spring substantially as set forth.

In testimony whereof I have hereunto set my hand this 29th day of May, A. D. 1894.

CON D. ANDERSON.

Witnesses:
OLIVER H. MILLER,
CHAS. I. WELCH.